United States Patent [19]
Inoue et al.

[11] Patent Number: 6,090,506
[45] Date of Patent: Jul. 18, 2000

[54] NONAQUEOUS SECONDARY BATTERY

[75] Inventors: Noriyuki Inoue; Hiroshi Inoue; Kazuo Sugiyama, all of Kanagawa, Japan

[73] Assignee: Fuji Photo Film Co. Ltd., Kanagawa, Japan

[21] Appl. No.: 08/904,184

[22] Filed: Aug. 1, 1997

[30] Foreign Application Priority Data

Aug. 2, 1996 [JP] Japan ................................. 8-204416

[51] Int. Cl.[7] .................................................... H01M 4/62
[52] U.S. Cl. ........................ 429/232; 429/137; 429/231.1; 429/218.1
[58] Field of Search ........................... 429/231.95, 234, 429/232, 246, 162, 231.1, 218.1, 137

[56] References Cited

U.S. PATENT DOCUMENTS

| | | | |
|---|---|---|---|
| 4,080,489 | 3/1978 | Dey .................................. | 429/211 |
| 5,028,500 | 7/1991 | Fong et al. ........................ | 429/194 |
| 5,147,739 | 9/1992 | Beard ................................ | 429/194 |
| 5,314,765 | 5/1994 | Bates ................................ | 429/231.95 |
| 5,478,671 | 12/1995 | Idota ................................. | 429/194 |
| 5,512,389 | 4/1996 | Dasgupta et al. .................. | 429/192 |
| 5,589,297 | 12/1996 | Koga et al. ........................ | 429/212 |
| 5,618,640 | 4/1997 | Idota et al. ........................ | 429/218.1 |
| 5,665,491 | 9/1997 | Tomiyama et al. ................. | 429/194 |
| 5,705,291 | 1/1998 | Amatucci et al. .................. | 429/137 |
| 5,705,292 | 1/1998 | Yukita et al. ...................... | 429/137 |

*Primary Examiner*—Maria Nuzzolillo
*Assistant Examiner*—J. O'Malley
*Attorney, Agent, or Firm*—Sughrue, Mion, Zinn, Macpeak & Seas, PLLC

[57] ABSTRACT

The present invention provides a nonaqueous secondary battery having a high discharge potential, a high discharge capacity, a good charge-discharge cycle characteristics and good high current charge-discharge characteristics. That is, a novel nonaqueous secondary battery is disclosed, comprising a sheet-shaped positive electrode having at least one layer containing a lithium-containing transition metal compound as a positive electrode material, a sheet-shaped negative electrode having at least one layer containing a negative electrode material capable of intercalating and deintercalating a lithium ion, a porous separator comprising polyolefines, and a nonaqueous electrolyte containing a lithium salt, wherein at least one of said sheet-shaped negative electrode and said sheet-shaped positive electrode comprises three or more layers applied to a current collector and the two layers furthest from said current collector each contain an insulating solid fine particle which doesn't substantially intercalate and deintercalate a lithium ion.

14 Claims, 1 Drawing Sheet

FIGURE
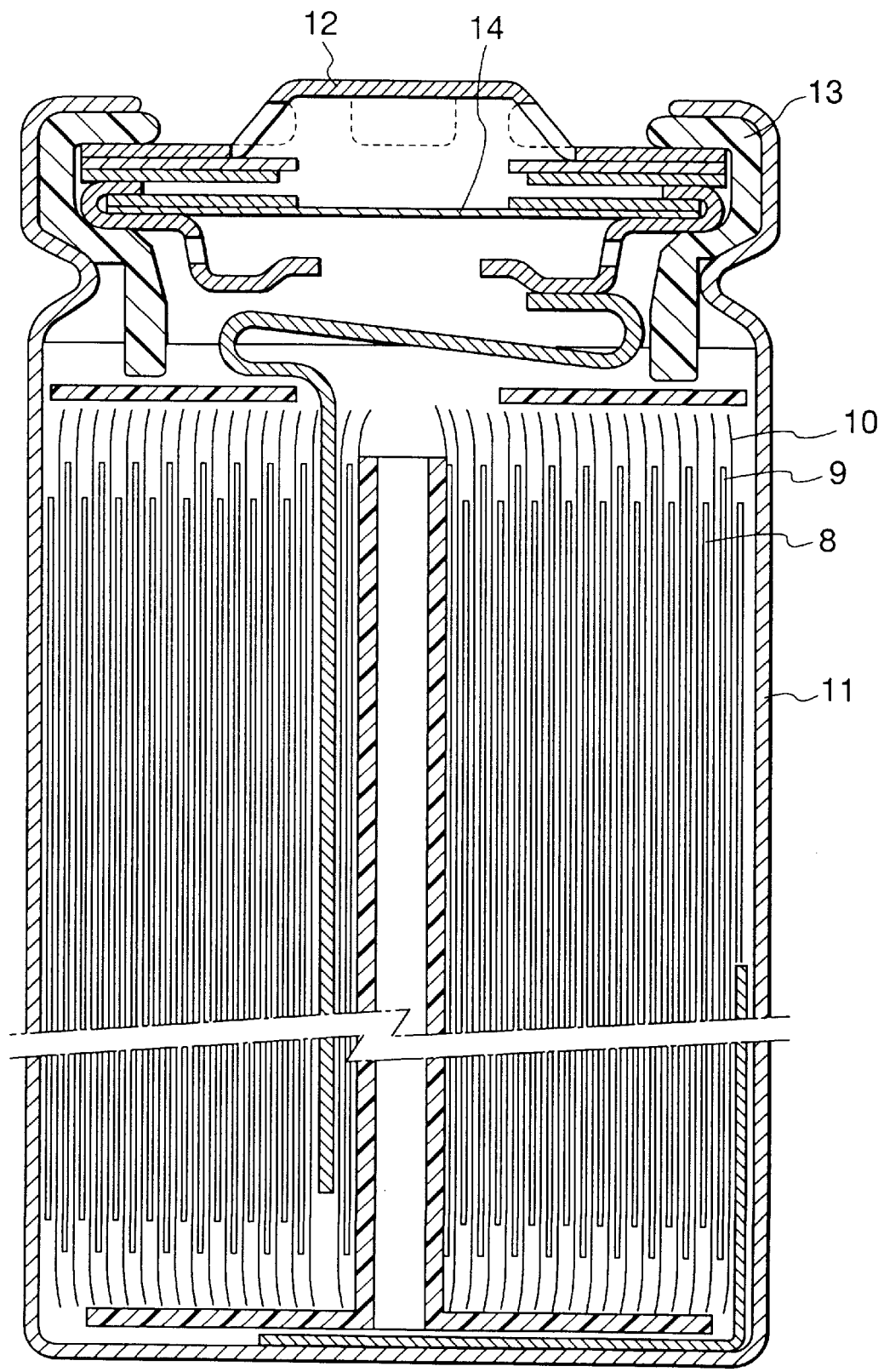

NONAQUEOUS SECONDARY BATTERY

FIELD OF THE INVENTION

The present invention relates to a nonaqueous secondary battery which can be obtained at an improved productivity, discharges at a high potential and exhibits a prolonged life and an excellent safety.

BACKGROUND OF THE INVENTION

Nonaqueous secondary batteries comprising lithium can be expected to provide a high capacity and thus have been widely developed. In general, these lithium secondary batteries comprise a positive electrode and a negative electrode each comprising a material capable of reversibly intercalating and deintercalating a lithium, a nonaqueous electrolyte containing a lithium salt, and a separator. However, these prior art nonaqueous secondary batteries are disadvantageous in that if designed to accomplish their essential purposes, i.e., discharge at a high potential and secure a prolonged life and a high capacity, they exhibit a deteriorated preservability.

SUMMARY OF THE INVENTION

An object of the present invention is to enhance the productivity of a nonaqueous secondary battery which can discharge at a high potential and exhibits a good charge-discharge cycle characteristics and an excellent preservability.

The foregoing object of the present invention is accomplished with a nonaqueous secondary battery comprising a sheet-shaped positive electrode having at least one layer containing a lithium-containing transition metal compound as a positive electrode material, a sheet-shaped negative electrode having at least one layer containing a negative electrode material capable of intercalating and deintercalating a lithium ion, a porous separator comprising polyolefines, and a nonaqueous electrolyte containing a lithium salt, wherein at least one of said sheet-shaped negative electrode and said sheet-shaped positive electrode comprises three or more layers applied to a current collector and the two layers furthest from said current collector each contain an insulating solid fine particle which doesn't substantially intercalate and deintercalate a lithium ion.

BRIEF DESCRIPTION OF THE DRAWING

FIG. 1 illustrates a cross-sectional view of a cylindrical battery used in the example, wherein the reference numeral 8 indicates a positive electrode sheet, the reference numeral 9 indicates a negative electrode sheet, the reference numeral 10 indicates a separator, the reference numeral 11 indicates a battery case, the reference numeral 12 indicates a battery cap, the reference numeral 13 indicates a gasket, and the reference numeral 14 indicates an explosion-proof valve.

DETAILED DESCRIPTION OF THE INVENTION

The embodiments of the present invention will be described hereinafter, but the present invention should not be construed as being limited thereto.

(1) A nonaqueous secondary battery comprising a sheet-shaped positive electrode having at least one layer containing a lithium-containing transition metal compound as a positive electrode material, a sheet-shaped negative electrode having at least one layer containing a negative electrode material capable of intercalating and deintercalating a lithium ion, a porous separator comprising polyolefines, and a nonaqueous electrolyte containing a lithium salt, wherein at least one of said sheet-shaped negative electrode and said sheet-shaped positive electrode comprises three or more layers applied to a current collector and the two layers furthest from said current collector each contain an insulating solid fine powder which doesn't substantially intercalate and deintercalate a lithium ion.

Further the embodiment preferred in the present invention will be described below.

(2) The nonaqueous secondary battery according to the above item (1), wherein said two layers furthest from the current collector have different contents of the insulating solid fine particle which doesn't substantially intercalate and deintercalate a lithium ion and the content of the insulating solid fine particle in the outermost layer is 5% lower than that in the adjacent layer.

(3) The nonaqueous secondary battery according to the above items (1) or (2), wherein said two layers furthest from the current collector each contain the insulating solid fine particle which doesn't substantially intercalate and deintercalate a lithium ion and a hydrophilic high molecular compound, and the content of the hydrophilic high molecular compound in the outermost layer is higher than that in the adjacent layer.

(4) The nonaqueous secondary battery according to any one of the above items (1) to (3), wherein said two layers furthest from the current collector each contain an insulating solid fine particle which doesn't substantially intercalate and deintercalate a lithium ion and an electrically-conductive particle, and the content of the electrically-conductive particle in the outermost layer is higher than that in the adjacent layer.

(5) The nonaqueous secondary battery according to any one of the above items (1) to (4), wherein said two layers furthest from the current collector each contain an insulating solid fine particle which doesn't substantially intercalate and deintercalate a lithium ion and contain an electrode material capable of intercalating and deintercalating a lithium ion in an amount of from 1% by weight to 40% by weight per the total weight of the insulating solid fine particle.

(6) The nonaqueous secondary battery according to any one of the above items (1) to (5), wherein said two layers furthest from the current collector each have a thickness of from 0.1 μm to 40 μm.

(7) The nonaqueous secondary battery according to any one of the above items (1) to (6), wherein said insulating solid fine powder is composed of an inorganic oxide.

(8) The nonaqueous secondary battery according to any one of the above items (1) to (7), wherein said electrode sheet comprising three or more layers applied to a current collector is a negative electrode sheet.

(9) The nonaqueous secondary battery according to any one of the above items (1) to (8), wherein said lithium ion has previously been electrochemically incorporated into said negative electrode material prior to and/or during the assembly of battery.

(10) The nonaqueous secondary battery according to any one of the above items (1) to (9), wherein the previous incorporation of a lithium ion is carried out by sticking a lithium metal foil having a thickness of from 10 μm to 70 μm to said negative electrode sheet.

(11) The nonaqueous secondary battery according to any one of the above items (1) to (10), wherein the amount of lithium in said lithium metal foil is from 10 mg to 2 g per g of the negative electrode material.

(12) The nonaqueous secondary battery according to any one of the above items (1) to (11), wherein said negative electrode material is an oxide or chalcogenide compound mainly composed of at least one element selected from the group consisting of elements of the group XIII, XIV and XV of the Periodic Table.

(13) The nonaqueous secondary battery according to any one of the above items (1) to (12), wherein said negative electrode material is an oxide or chalcogenide compound mainly composed of at least one element selected from the group consisting of Pb, Sn, Ge and Si.

(14) The nonaqueous secondary battery according to any one of the above items (1) to (13), wherein said negative electrode material is an amorphous oxide mainly comprising Sn.

(15) The nonaqueous secondary battery according to any one of the above items (1) to (14), wherein said negative electrode material is an amorphous oxide represented by formula (I):

$$SnM^1_a M^2_b O_s \quad (I)$$

wherein $M^1$ represents at least one element selected from the group consisting of Al, B, P, Ge and Si; $M^2$ represents at least one element selected from the group consisting of elements of the group I, II and III of the Periodic Table and halogen elements; a represents a number of from 0.2 to 2; b represents a number of from 0.01 to 1; and s represents a number of from 1 to 6, with the proviso that a and b satisfy the relationship:

$$0.2 < a+b < 2$$

The present invention will be further described hereinafter. The negative electrode sheet of the present invention comprises at least two layers containing an insulating solid fine particle which doesn't substantially intercalate and deintercalate a lithium ion. Exemplifying an embodiment of the layer structure of the present invention, there are arranged a coating layer of an electrode material capable of intercalating and deintercalating a lithium ion, layers containing an insulating fine particle, and an outermost layer containing an insulating fine particle as viewed from the current collector side.

The layers containing an insulating solid fine particle which doesn't substantially intercalate and deintercalate a lithium ion (hereinafter referred to as "auxiliary layers" distinguished from the coating layer of an electrode material) will be further described hereinafter. The thickness of these auxiliary layers have each a thickness of preferably from 0.1 to 40 μm, more preferably from 0.5 to 20 μm.

The content of the insulating solid fine particle which doesn't substantially intercalate and deintercalate a lithium ion is preferably from 10 to 90% by weight, more preferably from 20 to 80% by weight. It is preferred that the content of the insulating solid fine particle becomes less away from the current collector. The difference in the content of the insulating solid fine particle between the layer close to the current collector and the layer far from the current collector is preferably not less than 5% by weight, more preferably not less than 10% by weight.

The auxiliary layers of the present invention may contain the electrode material described hereinafter in an amount of the range that is not influenced. That is, the amount of the electrode material is preferably 1 to 40% by weight and more preferably 2 to 20% by weight per the total weight of the insulating solid fine particle which doesn't substantially intercalate and deintercalate a lithium ion.

Examples of the insulating solid fine particle which doesn't substantially intercalate and deintercalate a lithium ion include carbide, silicide, nitride, sulfide and oxide particles of metallic and nonmetallic elements.

Preferred among these carbides, silicides and nitrides are SiC, aluminum nitride (AlN), BN and BP, which are highly insulating and chemically stable. SiC obtained with BeO, Be or BN as a sintering aid is particularly preferred.

Preferred among chalcogenides are oxides, particularly oxides which can hardly be oxidized or reduced.

Examples of these oxides include $Al_2O_3$, $As_4O_6$, $B_2O_3$, BaO, BeO, CaO, $Li_2O$, $K_2O$, $Na_2O$, $In_2O_3$, MgO, $Sb_2O_5$, $SiO_2$, SrO, and $ZrO_4$. Particularly preferred among these oxides are $Al_2O_3$, BaO, BeO, CaO, $K_2O$, $Na_2O$, MgO, $SiO_2$, SrO, and $ZrO_4$. These oxides may be in the form of single oxide or composite oxide. Preferred examples of composite oxide include mullite ($3Al_2O_3 \cdot 2SiO_2$), steatite ($MgO \cdot SiO_2$), forsterite ($2MgO \cdot SiO_2$), and cordierite ($2MgO \cdot 2Al_2O_3 \cdot 5SiO_2$).

These inorganic compound particles may be produced or crushed under various conditions to have a particle size of from 0.1 μm to 20 μm, particularly from 0.2 μm to 15 μm.

The auxiliary layers of the present invention each may contain a hydrophilic high molecular compound, an electrically-conductive particle and an electrode material described later capable of intercalating and deintercalating a lithium ion as necessary besides the foregoing insulating solid fine particle.

Examples of the hydrophilic high molecular compound include polysaccharides such as starch, polyvinyl alcohols having different saponification degree, cellulose derivatives such as carboxymethyl cellulose, polyvinyl pyrrolidone, and polyethylene oxide. Particularly preferred among these hydrophilic high molecular compounds is carboxymethyl cellulose. The amount of the hydrophilic high molecular compound to be added is preferably from 0.1% by weight to 20% by weight, more preferably from 0.3% by weight to 10% by weight based on the weight of the auxiliary layer. The content of the hydrophilic high molecular compound in the outermost layer is higher than that in the adjacent layer, i.e., preferably at least 1.1 times, more preferably at least 1.3 times that in the adjacent layer.

As the electrically-conductive particle there may be used any electronically-conductive material which undergoes no chemical change in an assembled battery. Electrically-conductive materials such as natural graphite (e.g., scale graphite, flake graphite, lumpy graphite), artificial graphite, carbon black, acetylene black, ketjen black, carbon fiber, metal (e.g., copper, nickel, aluminum, silver) powder, metal fiber and polyphenylene derivative may be used singly or in admixture. Particularly preferred among these electrically-conductive materials are graphite and acetylene black. The amount of these electrically-conductive materials to be incorporated is preferably from 1 to 50% by weight, more preferably from 2 to 30% by weight, particularly from 3 to 15% by weight. The content of the electrically-conductive material in the outermost layer is higher than that in the adjacent layer, i.e., preferably at least 1.2 times, more preferably at least 1.4 times that in the adjacent layer.

The content of the electrode material, particularly the electrode material described later, is preferably from 0 to 40% by weight, more preferably from 0 to 20% by weight, particularly preferably from 0 to 10% by weight.

The auxiliary layers of the present invention may comprise a binder such as fluororesin described later incorporated therein besides the foregoing materials.

The auxiliary layers of the present invention may be applied to either or both of the positive electrode and negative electrode. If the positive electrode or negative electrode is formed by applying an electrode material mixture to both sides of the current collector, a protective layer may be applied to either or both sides thereof. However, it is necessary that a protective layer be applied to either one of positive electrode and negative electrode provided opposed to each other with a separator provided interposed therebetween. In a particularly preferred embodiment, an auxiliary layer is formed on the negative electrode.

The application of the auxiliary layers may be accomplished by a successive process which comprises applying a material mixture containing a material capable of reversibly intercalating and deintercalating a lithium ion to the current collector, and then applying a protective layer thereon or a simultaneous coating process which comprises simultaneously applying an electrode material mixture layer and a protective layer to the current collector.

The negative electrode material to be used in the present invention is an oxide or chalcogenide capable of intercalating and deintercalating lithium.

It is preferably an oxide or chalcogenide mainly composed of at least one element selected from the group consisting of elements of the group XIII, XIV and XV of the Periodic Table.

More preferably, it is an oxide or chalcogenide mainly composed of at least one element selected from the group consisting of Pb, Sn, Ge and Si.

Examples of such an oxide or chalcogenide include $Ga_2O_3$, $SiO$, $GeO$, $GeO_2$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $Bi_2O_5$, $SnSiO_3$, $GeS$, $GeS_2$, $SnS$, $SnS_2$, $PbS$, $PbS$, $PbS_2$, $Sb_2S_3$, $Sb_2S_5$, and $SnSiS_3$. These oxides or chalcogenides may be in the form of composite oxide with lithium oxide, e.g., $Li_2GeO_3$ and $Li_2SnO_2$.

These compounds may comprise a transition metal incorporated therein. Examples of such compounds comprising a transition metal incorporated therein include $SnMnO_2$, $SnMnO_3$, $SnTiO_2$, $SnTiO_3$, $SnWO_3$, $SnWO_4$, $SnVO_{3.5}$, $SnVO_{4.5}$, $SnFeO_{2.5}$, $SnFeO_{3.5}$, $SnCoO_2$, $SnCoO_3$, $SnNiO_2$, $SnNiO_3$, $SnCuO_2$, $SnCuO_3$, $SnMoO_3$, $SnMoO_4$, $SnMoO_5$, $SnAgO_{1.5}$, $SnAg_{2.5}$, $GeMnO_2$, $GeMnO_3$, $GeTiO_2$, $GeTiO_3$, $GeWO_3$, $GeWO_4$, $GeVO_{3.5}$, $GeVO_{4.5}$, $GeFeO_{2.5}$, $GeFeO_{3.5}$, $GeCoO_2$, $GeCoO_3$, $GeNiO_2$, $GeNiO_3$, $GeCuO_2$, $GeCuO_3$, $GeMoO_3$, $GeMoO_4$, $GeMoO_5$, $GeAgO_{1.5}$, $GeAg_{2.5}$, $SiMnO_2$, $SiMnO_3$, $SiTiO_2$, $SiTiO_3$, $SiWO_3$, $SiWO_4$, $SiVO_{3.5}$, $SiVO_{4.5}$, $SiFeO_{2.5}$, $SiFeO_{3.5}$, $SiCoO_2$, $SiCoO_3$, $SiNiO_2$, $SiNiO_3$, $SiCuO_2$, $SiCuO_3$, $SiMoO_3$, $SiMoO_4$, $SiMoO_5$, $SiAgO_{1.5}$, $SiAg_{2.5}$, $PbnMnO_2$, $PbMnO_3$, $PbTiO_2$, $PbTiO_3$, $PbWO_3$, $PbWO_4$, $PbVO_{3.5}$, $PbVO_{4.5}$, $PbFeO_{2.5}$, $PbFeO_{3.5}$, $PbCoO_2$, $PbCoO_3$, $PbNiO_2$, $PbNiO_3$, $PbCuO_2$, $PbCuO_3$, $PbMoO_3$, $PbMoO_4$, $PbMoO_5$, $PbAgO_{1.5}$, and $PbAg_{2.5}$. These compounds may be in the form of composite oxide with lithium.

The foregoing composite oxide or composite chalcogenide preferably stays amorphous during the assembly of battery.

The term "amorphous" as used herein means that it has a broad scattering band having a peak at 20° to 40° in the terms of a 2θ value as analyzed by X-ray diffractometry using CuKα ray. Such an amorphous material may show crystalline diffraction line. The highest intensity of crystalline diffraction line shown in a range of 20° to 70° in the terms of a 2θ value is preferably not more than 500 times, more preferably not more than 100 times, particularly preferably not more than 5 times that of peak diffraction in a broad scattering band shown in a range of 20° to 70° in the terms of a 2θ value. Most preferably, the amorphous material shows no crystalline diffraction line.

In the present invention, an amorphous oxide mainly comprising Sn is further preferred. In particular, an amorphous oxide represented by formula (I) is preferred:

$$SnM^1_aM^2_bO_s \qquad (I)$$

wherein $M^1$ represents at least one element selected from the group consisting of Al, B, P, Ge and Si; $M^2$ represents at least one element selected from the group consisting of elements of the group I, II and III of the Periodic Table and halogen elements; a represents a number of from 0.2 to 2; b represents a number of from 0.01 to 1; and s represents a number of from 1 to 6, with the proviso that a and b satisfy the relationship:

$$0.2 < a+b < 2$$

Examples of the amorphous oxide mainly comprising Sn and the amorphous oxide represented by formula (I) will be given below, but the present invention should not be construed as being limited thereto.

$SnAl_{0.4}B_{0.5}P_{0.5}K_{0.1}O_{3.65}$, $SnAl_{0.4}B_{0.5}P_{0.5}Na_{0.2}O_{3.7}$, $SnAl_{0.4}B_{0.3}P_{0.5}Rb_{0.2}O_{3.4}$, $SnAl_{0.4}B_{0.5}P_{0.5}Cs_{0.1}O_{3.65}$, $SnAl_{0.4}B_{0.5}P_{0.5}K_{0.1}Ge_{0.05}O_{3.85}$, $SnAl_{0.4}B_{0.5}P_{0.5}K_{0.1}Mg_{0.1}Ge_{0.02}O_{3.83}$, $SnAl_{0.4}B_{0.4}P_{0.4}O_{3.2}$, $SnAl_{0.3}B_{0.5}P_{0.2}O_{2.7}$, $SnAl_{0.4}B_{0.5}P_{0.3}Ba_{0.08}Mg_{0.05}O_{3.26}$, $SnAl_{0.4}B_{0.4}P_{0.4}Ba_{0.08}O_{3.28}$, $SnAl_{0.4}B_{0.5}P_{0.5}O_{3.6}$, $SnAl_{0.4}B_{0.5}P_{0.5}Mg_{0.1}O_{3.7}$, $SnAl_{0.5}B_{0.4}P_{0.5}Mg_{0.1}F_{0.2}O_{3.65}$, $SnB_{0.5}P_{0.5}Li_{0.1}Mg_{0.1}F_{0.2}O_{3.05}$, $SnB_{0.5}P_{0.5}K_{0.1}Mg_{0.1}F_{0.2}O_{3.05}$, $SnB_{0.5}P_{0.5}K_{0.05}Mg_{0.05}F_{0.1}O_{3.03}$, $SnB_{0.5}P_{0.5}K_{0.05}Mg_{0.1}F_{0.2}O_{3.03}$, $SnAl_{0.4}B_{0.5}P_{0.5}Cs_{0.1}Mg_{0.1}F_{0.2}O_{3.65}$, $SnB_{0.5}P_{0.5}Cs_{0.05}Mg_{0.05}F_{0.1}O_{3.03}$, $SnB_{0.5}P_{0.5}Mg_{0.1}F_{0.1}O_{3.05}$, $SnB_{0.5}P_{0.5}Mg_{0.1}F_{0.2}O_3$, $SnB_{0.5}P_{0.5}Mg_{0.1}F_{0.06}O_{3.07}$, $SnB_{0.5}P_{0.5}Mg_{0.1}F_{0.14}O_{3.03}$, $SnPBa_{0.08}O_{3.58}$, $SnPK_{0.1}O_{3.55}$, $SnPK_{0.05}Mg_{0.05}O_{3.58}$, $SnPCs_{0.1}O_{3.55}$, $SnPBa_{0.08}F_{0.08}O_{3.54}$, $SnPK_{0.1}Mg_{0.1}F_{0.2}O_{3.55}$, $SnPK_{0.05}Mg_{0.05}F_{0.1}O_{3.53}$, $SnPCs_{0.1}Mg_{0.1}F_{0.2}O_{3.55}$, $SnPCs_{0.05}Mg_{0.05}F_{0.1}O_{3.53}$, $Sn_{1.1}Al_{0.4}B_{0.2}P_{0.6}Ba_{0.08}F_{0.08}O_{3.54}$, $Sn_{1.1}Al_{0.4}B_{0.2}P_{0.6}Li_{0.1}K_{0.1}Ba_{0.1}F_{0.1}O_{3.65}$, $Sn_{1.1}Al_{0.4}B_{0.4}P_{0.4}Ba_{0.08}O_{3.53}$, $Sn_{1.1}Al_{0.4}PCs_{0.05}O_{4.23}$, $Sn_{1.1}Al_{0.4}PK_{0.05}O_{4.23}$, $Sn_{1.2}Al_{0.5}B_{0.3}P_{0.4}Cs_{0.2}O_{3.5}$, $Sn_{1.2}Al_{0.4}B_{0.2}P_{0.6}Ba_{0.08}O_{3.68}$, $Sn_{1.2}Al_{0.4}B_{0.2}P_{0.6}Ba_{0.08}F_{0.08}O_{3.64}$, $Sn_{1.2}Al_{0.4}B_{0.2}P_{0.6}Mg_{0.04}Ba_{0.04}O_{3.68}$, $Sn_{1.2}Al_{0.4}B_{0.3}P_{0.5}Ba_{0.08}O_{3.58}$, $Sn_{1.3}Al_{0.3}B_{0.3}P_{0.4}Na_{0.2}O_{3.3}$, $Sn_{1.3}Al_{0.2}B_{0.4}P_{0.4}P_{0.4}Ca_{0.2}O_{3.4}$, $Sn_{1.3}Al_{0.4}B_{0.4}P_{0.4}Ba_{0.2}O_{3.6}$, $Sn_{1.4}Al_{0.4}PK_{0.2}O_{4.6}$, $Sn_{1.4}Al_{0.2}Ba_{0.1}PK_{0.2}O_{4.45}$, $Sn_{1.4}Al_{0.2}Ba_{0.2}KP_{0.2}O_{4.6}$, $Sn_{1.4}Al_{0.4}Ba_{0.2}PK_{0.2}Ba_{0.1}F_{0.2}O_{4.9}$, $Sn_{1.4}Al_{0.4}PK_{0.3}O_{4.65}$, $Sn_{1.5}Al_{0.2}PK_{0.2}O_{4.4}$, $Sn_{1.5}Al_{0.4}PK_{0.1}O_{4.65}$, $Sn_{1.5}Al_{0.4}PCs_{0.05}O_{4.63}$, $Sn_{1.5}Al_{0.4}PCs_{0.05}Mg_{0.1}F_{0.2}O_{4.63}$, $SnSi_{0.5}Al_{0.1}B_{0.2}P_{0.1}Ca_{0.4}O_{3.1}$, $SnSi_{0.4}Al_{0.2}B_{0.4}O_{2.7}$, $SnSi_{0.5}Al_{0.2}B_{0.1}P_{0.1}Mg_{0.1}O_{2.8}$, $SnSi_{0.6}Al_{0.2}B_{0.2}O_{2.8}$, $SnSi_{0.5}Al_{0.3}B_{0.4}P_{0.2}O_{3.55}$, $SnSi_{0.5}Al_{0.3}B_{0.4}P_{0.5}O_{4.30}$, $SnSi_{0.6}Al_{0.1}B_{0.1}P_{0.3}O_{3.25}$, $SnSi_{0.6}Al_{0.1}B_{0.1}P_{0.1}Ba_{0.2}O_{2.95}$, $SnSi_{0.6}Al_{0.1}B_{0.1}P_{0.1}Ca_{0.2}O_{2.95}$, $SnSi_{0.6}Al_{0.4}B_{0.2}Mg_{0.1}O_{3.2}$, $SnSi_{0.6}Al_{0.1}B_{0.3}P_{0.1}O_{3.05}$, $SnSi_{0.6}Al_{0.2}Mg_{0.2}O_{2.7}$, $SnSi_{0.6}Al_{0.2}Ca_{0.2}O_{2.7}$, $SnSi_{0.6}Al_{0.2}P_{0.2}O_3$, $SnSi_{0.6}B_{0.2}P_{0.2}O_3$, $SnSi_{0.8}Al_{0.2}O_{2.9}$, $SnSi_{0.8}Al_{0.3}B_{0.2}P_{0.2}O_{3.85}$, $SnSi_{0.8}B_{0.2}O_{2.9}$, $SnSi_{0.8}Ba_{0.2}O_{2.8}$, $SnSi_{0.8}Mg_{0.2}O_{2.8}$, $SnSi_{0.8}Ca_{0.2}O_{2.8}$, $SnSi_{0.8}P_{0.2}O_{3.1}$, $Sn_{0.9}Mn_{0.3}B_{0.4}P_{0.4}Ca_{0.1}Rb_{0.1}O_{2.95}$, $Sn_{0.9}Fe_{0.3}B_{0.4}P_{0.4}Ca_{0.1}Rb_{0.1}O_{2.95}$, $Sn_{0.8}Pb_{0.2}Ca_{0.1}P_{0.9}O_{3.35}$, $Sn_{0.9}Mn_{0.1}Mg_{0.1}P_{0.9}O_{3.35}$, $Sn_{0.2}Mn_{0.8}Mg_{0.1}P_{0.9}O_{3.35}$, $Sn_{0.7}Pb_{0.3}Ca_{0.1}P_{0.9}O_{3.35}$.

The oxide or chalcogenide of the present invention may be subjected to either calcining or solution process, preferably calcining process. In a preferred embodiment of the calcining process, oxides, chalcogenides or compounds of the corresponding elements are thoroughly mixed, and then calcined to obtain an amorphous oxide and/or chalcogenide.

Referring to the calcining conditions, the rate of temperature rise is preferably from 5° C. to 200° C. per minute, the calcining temperature is preferably from 500° C. to 1,500° C., the calcining time is preferably from 1 hour to 100 hours, and the rate of temperature drop is preferably from 2° C. to $10^{7°}$ C. per minute.

The term "rate of temperature rise" as used herein means the average rate of temperature rise from "50% of the calcining temperature (° C.)" to "80% of the calcining temperature (° C.)". The term "rate of temperature drop" as used herein means the average rate of temperature drop from "80% of the calcining temperature (° C.)" to "50% of the calcining temperature (° C.)".

The cooling of the calcined material may be accomplished by allowing the material to cool in the calcining or by taking out it from the calcining furnace, and then putting it into water. Alternatively, super-quenching method such as gun method, Hammer-Anvil method, slap method, gas atomizing method, plasma spray method, centrifugal quenching method and melt drag method as described in "Ceramics Processing", page 217, Gihodo, 1987, may be employed. Further, a single roller method and a twin-roller method as described in "New Glass Handbook", Maruzen, 1991, page 172, may be employed to cool the calcined material. In the case where the raw material can be melted during calcining, the calcined material may be continuously taken out while the raw material is being supplied during calcining. In this case, the molten material is preferably stirred during calcining.

The calcining gas atmosphere is preferably an atmosphere having an oxygen content of not more than 5 vol-%, more preferably an inert gas atmosphere. Examples of the inert gas include nitrogen, argon, helium, krypton, and xenon. The most desirable inert gas is pure argon.

The average particle size of the negative electrode material to be used in the present invention is preferably from 0.1 to 60 μm. In order to provide the predetermined particle size, well-known grinders or classifiers may be employed. For example, mortar, ball mill, sand mill, vibration mill, satellite ball mill, planetary ball mill, spinning air flow type jet mill or sieve may be employed. A wet grinding method which comprises grinding in the presence of water or an organic solvent such as methanol may be optionally effected. In order to provide the desired particle diameter, classification is preferably effected. The classification method is not specifically limited. A sieve, air classifier, etc. may be optionally used. The classification may be effected in either or both of dry process and wet process.

The chemical formula of the compound obtained by calcining can be determined by inductively coupled plasma (ICP) emission spectroscopic analysis or simply calculated from the difference in weight between before and after calcining.

The negative electrode material of the present invention may comprise various elements incorporated therein. Examples of these elements to be incorporated as dopants in the negative electrode material include lanthanoide metals (e.g., Hf, Ta, W, Re, Os, Ir, Pt, Au, Hg), and various electron conduction donative compounds (e.g., Sb, In and Nb compounds). The amount of such the compounds to be incorporated in the negative electrode material is preferably from 0 to 5 mol-%.

The positive electrode active material to be used in the present invention may be an oxide of transition metal capable of reversibly intercalating and deintercalating a lithium ion. In particular, a lithium-containing transition metal oxide is desirable. Preferred examples of the lithium-containing transition metal oxide employable herein as a positive electrode active material include lithium-containing Ti, V, Cr, Mn, Fe, Co, Ni, Cu, Mo and W oxides. The transition metal may be mixed with an alkaline metal other than lithium (elements of the group IA and IIA of the Periodic Table), and/or Al, Ga, In, Ge, Sn, Pb, Sb, Bi, Si, P, B, etc. The amount of these elements to be incorporated is preferably from 0 to 30 mol-% based on the transition metal.

In a preferred embodiment of the present invention, the lithium-containing transition metal oxide to be used as a positive electrode active material is obtained by mixing a lithium compound and a transition metal compound (transition metal: at least one selected from the group consisting of Ti, V, Cr, Mn, Fe, Co, Ni, Mo, and W) in a total molar ratio of from 0.3 to 2.2, and then processing the mixture.

In a particularly preferred embodiment of the present invention, the lithium-containing transition metal oxide to be used as a positive electrode active material is obtained by mixing a lithium compound and a transition metal compound (transition metal: at least one selected from the group consisting of V, Cr, Mn, Fe, Co, and Ni) in a total molar ratio of from 0.3 to 2.2, and then processing the mixture.

A particularly preferred lithium-containing transition metal oxide to be used as a positive electrode active material is $Li_xQO_y$ (in which Q is mainly composed of a transition metal containing at least one of Co, Mn, Ni, V and Fe, x represents a number of from 0.2 to 1.2, and y represents a number of from 1.4 to 3). Q comprises Al, Ga, In, Ge, Sn, Pb, Sb, Bi, Si, P, B, etc. incorporated therein besides transition metals. The amount of these elements to be incorporated in Q is preferably from 0 to 30 mol-% based on the amount of transition metals.

Preferred examples of the lithium-containing metal oxide to be used as a positive electrode material herein include $Li_xCoO_2$, $Li_xNiO_2$, $Li_xMnO_2$, $Li_xCo_aNi_{1-a}O_2$, $Li_zCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_z$, $Li_xMn_cFe_{2-c}O_4$, $Li_xCo_bB_{1-b}O_2$, $Li_xCo_bSi_{1-b}O_2$, mixture of $Li_xMn_2O_4$ and $MnO_2$, mixture of $Li_{2x}MnO_3$ and $MnO_2$, and mixture of $Li_xMn_2O_4$, $Li_{2x}MnO_3$ and $MnO_2$ (in which x represents a number of 0.2 to 1.2, a represents a number of 0.1 to 0.9, b represents a number of 0.8 to 0.98, c represents a number of 1.6 to 1.96, and z represents a number of 2.01 to 5).

Preferred examples of the lithium-containing metal oxide to be used as an active positive electrode material herein include $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (in which x represents a number of 0.7 to 1.2, a represents a number of 0.1 to 0.9, b represents a number of 0.8 to 0.98, c represents a number of 1.6 to 1.96, and z represents a number of 2.01 to 2.3).

The most desirable examples of the lithium-containing transition metal oxide to be used as a positive electrode material herein include $Li_xCoO_2$, $Li_xNiO_2$, $Li_xMnO_2$, $Li_xCo_aNi_{1-a}O_2$, $Li_xMn_2O_4$, $Li_xCo_bV_{1-b}O_z$ (in which x represents a number of 0.7 to 1.2, a represents a number of 0.1 to 0.9, b represents a number of 0.9 to 0.98, and z represents a number of 2.02 to 2.3). The foregoing x value is defined before the beginning of charge and discharge. Thus, x is changed by the battery charges or discharges.

The positive electrode material can be synthesized by a process which comprises mixing a lithium compound and a transition metal compound, and then calcining the mixture or by solution reaction. In particular, the calcining process is preferred. The calcining temperature to be used in the present invention may be such that the compound mixture to be used in the present invention is partly decomposed and melted, preferably from 250° C. to 2,000° C., particularly preferably from 350° C. to 1,500° C. In the calcining process, the positive electrode material is preferably calcinated at a temperature of from 250° C. to 900° C. The calcining time is preferably from 1 to 72 hours, more preferably from 2 to 20 hours. The mixing of raw materials may be effected in either a dry process or wet process. The material thus calcined may be annealed at a temperature of from 200° C. to 900° C.

The gas atmosphere in which calcining is effected is not specifically limited. Either an oxidizing atmosphere or reducing atmosphere may be employed. Examples of such an atmosphere include air, gas having a predetermined oxygen concentration, hydrogen, carbon monoxide, nitrogen, argon, helium, krypton, xenon, and carbon dioxide.

As the process for chemically incorporating a lithium ion into the transition metal oxide during the synthesis of the positive electrode active material of the present invention there is preferably employed a process which comprises reacting metallic lithium, lithium alloy or butyl lithium with a transition metal oxide.

The average particle size of the positive electrode material to be used in the present invention is not specifically limited but is preferably from 0.1 to 50 $\mu$m. The specific surface area of the positive electrode material is not specifically limited but is preferably from 0.01 to 50 $m^2$/g as determined by BET method. The pH value of the supernatant liquid in a solution of 5 g of the positive electrode material in 100 ml of distilled water is preferably from 7 to 12.

In order to provide the predetermined particle size, well-known grinders or classifiers may be employed. For example, mortar, ball mill, vibration ball mill, vibration mill, satellite ball mill, planetary ball mill, spinning air flow type jet mill or sieve may be employed.

The positive electrode material obtained by calcining may be washed with water, an acidic aqueous solution, an alkaline aqueous solution or an organic solvent before use.

A preferred combination of a negative electrode material and a positive electrode active material to be used in the present invention is a combination of a compound represented by formula (I) and $Li_xCoO_2$, $Li_xNiO_2$, $Li_xCo_aNi_{1-a}O_2$, $Li_xMnO_2$, $Li_xMn_2O_4$ or $Li_xCo_bV_{1-b}O_z$ (in which x represents a number of 0.7 to 1.2, a represents a number of 0.1 to 0.9, b represents a number of 0.9 to 0.98, and z represents a number of 2.02 to 2.3). Such a combination can provide a nonaqueous secondary battery which can discharge at a high potential and shows a high capacity and an excellent charge-discharge cycle characteristics.

The amount of lithium to be incorporated in the negative electrode material of the present invention is from 3 to 10 equivalents. The ratio of lithium to the positive electrode active material is determined on the basis of this value. The ratio thus determined is preferably multiplied by a factor of 0.5 to 2. In the case where the lithium supply source is other than the positive electrode active material (e.g., metallic lithium, lithium alloy, butyl lithium), the amount of the positive electrode material to be used is determined on the basis of the equivalent of lithium to be released from the negative electrode material. In this case, too, the ratio thus determined is preferably multiplied by a factor of 0.5 to 2.

In the case where lithium is incorporated into the negative electrode from a lithium supply source other than the positive electrode, as such a lithium supply source there is preferably used metallic lithium or lithium alloy (alloy of lithium with Al, Al—Mn, Al—Mg, Al—Sn, Al—In, Al—Cd, etc.) in the form of foil or powder. Such the lithium supply source in the form of foil or the like may be disposed on the negative electrode material mixture directly or with a protective layer of the present invention provided interposed therebetween. Alternatively, the lithium supply source may be disposed on a current collector free of negative electrode material mixture. A metal foil having a thickness of as small as about 20 $\mu$m may be uniformly applied to the negative electrode material mixture. Alternatively, a metal foil having a greater thickness may be locally disposed on the negative electrode material mixture. The thickness of the metal foil can be determined by the amount of lithium to be spontaneously incorporated into the negative electrode after the assembly of battery.

The negative electrode material mixture may comprise an electrically conducting agent, a binder, a filler, etc. incorporated therein. As such the electrically conducting agent there may be used any electronically conductive material which undergoes no chemical change in the battery thus assembled. In general, electrically-conductive materials such as natural graphite (e.g., scale graphite, flake graphite, lumpy graphite), artificial graphite, carbon black, acetylene black, ketjen black, carbon fiber, metal (e.g., copper, nickel, aluminum, silver) powder, metal fiber and polyphenylene derivative may be used singly or in admixture. Particularly preferred among these electrically-conductive materials are combination of graphite and acetylene black. The amount of these electrically-conductive materials to be incorporated is preferably from 1 to 50% by weight, more preferably from 2 to 30% by weight, particularly preferably from 2 to 15% by weight when they are carbon black or graphite.

As binders there may be normally used polysaccharides, thermoplastic resins and polymers having rubber elasticity such as starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, ethylene-propylene-diethane polymer (EPDM), sulfonated EPDM, styrene-butadiene rubber, polybutadiene, fluororubber and polyethylene oxide, singly or in admixture. If a compound having a functional group which reacts with lithium such as polysaccharides is used, a compound having a group such as isocyanate group is preferably added to deactivate the functional group. The amount of the binder to be added-is preferably from 1 to 50% by weight, particularly preferably from 2 to 30% by weight.

As the filler there may be used any fibrous material which undergoes no chemical change in the battery thus assembled. In general, an olefinic polymer such as polypropylene and polyethylene, glass, carbon, etc. may be used in the form of fiber. The amount of the filler to be incorporated is not specifically limited but is preferably from 0 to 30% by weight.

In order to use the negative electrode material of the present invention in a nonaqueous secondary battery, a water-dispersed negative electrode material mixture paste containing the compound of the present invention is applied to a current collector on which it is then dried. The pH value of the water-dispersed material mixture paste is from not less than 5 to less than 10, preferably from not less than 6 to less than 9. Further, the temperature of the water-dispersed paste should be kept to a range of from not lower than 5° C. to lower than 80° C. The paste is preferably applied to the current collector within 7 days after preparation.

As the separator there may be used an insulating microporous or void material having a great permeability to ion and a predetermined mechanical strength. In order to enhance the safety, the separator needs to be capable of blocking the voids and hence raise the resistivity to an extent such that the current passage is stopped at a temperature of not lower than 80° C. The temperature at which these voids are blocked is preferably from 90° C. to 180° C., more preferably from 110° C. to 170° C.

The process for the formation of voids depends on the kind of material used. In practice, however, any known process may be employed. In the case of porous film, the shape of pores is normally circle or ellipse. The size of pores is from 0.05 to 30 $\mu$m, preferably from 0.1 to 20 $\mu$m. Alternatively, the shape of pores may be rod-like or amorphous as formed by orientation method, phase separation method or the like. In the case of fabric, voids occur between fibers and depend on the production method, i.e., woven or nonwoven. The proportion of these voids in the separator material, i.e., void ratio is preferably from 20% to 90%, more preferably from 35% to 80%.

The separator of the present invention is a porous separator comprising a microporous film or woven or nonwoven fabric having a thickness of preferably from 5 $\mu$m to 100 $\mu$m, more preferably from 10 $\mu$m to 80 $\mu$m.

The nonwoven or woven fabric preferably comprises a fiber having a diameter of from 0.1 $\mu$m to 5 $\mu$m such as polyethylene fibers, ethylene-propylene copolymer fibers, ethylene-butene 1 copolymer fibers, ethylene-methyl butene copolymer fibers, ethylene-methyl pentene copolymer fibers, polypropylene fibers or polyethylene tetrafluoride fibers. Among the film, woven fabric and nonwoven fabric for the porous separator of the present invention, a microporous film comprising pulyolefines is preferred as the separator of the present invention. That is, a microporous separator comprising a film such as polyethylene films and polypropylene films is particularly preferred as the separator of the present invention.

The microporous separator comprising polyolefines of the present invention preferably has an ethylene content of at least 20% by weight, particularly preferably not less than 30% by weight. Examples of components to be incorporated in the separator other than ethylene include propylene, butene, hexene, ethylene fluoride, vinyl chloride, vinyl acetate, and acetalated vinyl alcohol. Particularly preferred among these components are propylene and ethylene fluoride.

The microporous separator of the present invention may be made of a copolymer as for as the polyolefines is contained. That is, the microporous separator of the present invention preferably comprises ethylene-propylene copolymer or ethylene-butene copolymer. Further, the microporous separator may be a microporous film which is prepared by mixing and melting polyethylene and polypropylene, or polyethylene and polyethylene tetrafluoride.

The foregoing separator may be made of single film or composite film. In particular, a laminate of two or more microporous films having different pore diameters, void rates and pore-blocking temperature is particularly preferred.

Further, as the microporous separator of the present invention, a two layer type separator and three layer type separator are preferred. Also, a composite of different materials such as a composite of microporous film and nonwoven fabric is preferably used as the microporous separator of the present invention.

The separator of the present invention may comprise an inorganic fiber such as glass fiber and carbon fiber or inorganic material particle such as silicon dioxide, zeolite, alumina and talc particles incorporated therein. The separator of the present invention may be treated with a surface active agent on the voids or surface thereof to render itself hydrophilic.

The electrolyte to be contained in the battery comprises at least one of aprotic organic solvents such as propylene carbonate, ethylene carbonate, butylene carbonate, dimethyl carbonate, diethyl carbonate, $\gamma$-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, methyl propionate, ethyl propionate, phosphoric acid triester, trimethoxymethane, dioxolane derivative, sulfolane, 3-methyl-2-oxazolidinone, propylene carbonate derivative, tetrahydrofuran derivative, diethyl ether and 1,3-propanesultone and one or more lithium salts soluble therein, such as $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lower aliphatic lithium carboxylate, $LiAlCl_4$, $LiCl$, $LiBr$, $LiI$, chloroboran lithium and lithium tetraphenylborate. In particular, an electrolytic solution comprising $LiCF_3SO_3$, $LiClO_4$, $LiBF_4$ and/or $LiPF_6$ incorporated in a mixture of propylene carbonate or ethylene carbonate and 1,2-dimethoxyethane and/or diethyl carbonate is preferred. Further, an electrolytic solution comprising $LiBF_4$ and/or $LiPF_6$ incorporated in a mixture of ethylene carbonate and/or diethyl carbonate is particularly preferred.

The amount of the electrolyte to be incorporated in the battery is not specifically limited. In practice, however, a required amount of the electrolyte may be used depending on the amount of the positive electrode active material or negative electrode active material or the battery size. The concentration of the supporting electrolyte is preferably from 0.2 to 3 mols per l of the electrolytic solution.

Besides the electrolytic, the following solid electrolytes may be used. Solid electrolytes can be divided into two groups, i.e., inorganic solid electrolyte and organic solid electrolyte. As inorganic solid electrolytes there are well known nitride, halide and oxygen acid salt of Li. Particularly useful among these compounds are $Li_3N$, $LiI$, $Li_5NI_2$, $Li_3N$—$LiI$—$LiOH$, $LiSiO_4$, $LiSiO_4$—$NiI$—$LiOH$, $xLi_3PO_4$—$(1-x)Li_4SiO_4$, $Li_2SiS_3$, and phosphorus sulfide compound.

Useful examples of organic solid electrolytes include polyethylene oxide derivative, polymer containing such a derivative, polypropylene oxide derivative, polymer containing such a derivative, polymer containing an ion dissociating group, mixture of polymer containing an ion dissociating group and the foregoing aprotic electrolytic solution, and phosphoric acid ester polymer.

A polyacrylonitrile may be added to the electrolytic solution. Alternatively, an inorganic solid electrolyte and an organic solid electrolyte may be used in combination.

As the separator there may be used a thin insulating film having a great permeability to ion and a predetermined mechanical strength. From the standpoint of resistance to organic solvent and hydrophobicity, a sheet or nonwoven fabric made of olefinic polymer such as polypropylene, glass fiber or polyethylene may be used. The diameter of pores in the separator may be as defined in ordinary batteries, e.g., 0.01 to 10 μm. The thickness of the separator may be as defined in ordinary batteries, e.g., 5 to 300 μm.

It is known as a common practice to incorporate the following compounds in the electrolyte for the purpose of improving the discharge or charge-discharge characteristics of the battery. Examples of such the compounds include pyridine, triethyl phosphite, triethanolamine, cyclic ether, ethylenediamine, n-glyme, triamide hexaphosphate, nitrobenzene derivative, sulfur, quinoneimine dye, combination of N-substituted oxazolidinone and N,N'-substituted imidazolidinone, ethylene glycol dialkyl ether, quaternary ammonium salt, polyethylene glycol, pyrrole, 2-methoxyethanol, $AlCl_3$, monomer constituting electrically-conductive polymer as an electrode active material, triethylene phosphoramide, trialkyl phosphine, morpholine, aryl compound having a carbonyl group, combination of hexamethylphosphoric triamide and 4-alkylmorpholine, bicyclic tertiary amine, oil (JP-A-62-287,580 (The term "JP-A" as used herein means an "unexamined published Japanese patent application")), quaternary phosphonium salt, and tertiary sulfonium salt.

The electrolytic solution may comprise a halogen-containing solvent such as carbon tetrachloride and ethylene chloride trifluoride incorporated therein to render itself incombustible. Further, the electrolyte may comprise carbon dioxide gas incorporated therein to render itself preservable at high temperatures. The positive electrode and negative electrode material mixtures may comprise an electrolytic solution or an electrolyte. It is known that the positive electrode and negative electrode material mixtures may comprise the foregoing ionically-conductive polymer or nitromethane or an electrolytic solution.

As the current collector for the positive and negative electrodes there may be used any electronically-conductive material which undergoes no chemical change in the battery thus assembled. For the positive electrode, for example, stainless steel, nickel, aluminum, titanium, carbon, etc. may be used. Besides these materials, aluminum or stainless steel treated with carbon, nickel, titanium or silver on the surface thereof may be used.

In particular, aluminum or aluminum alloy is desirable. For the negative electrode, stainless steel, nickel, copper, titanium, aluminum, carbon, etc. may be used. Besides these materials, copper or stainless steel treated with carbon, nickel, titanium or silver on the surface thereof or Al—Cd alloy may be used. In particular, copper or copper alloy is preferred. These materials may be oxidized on the surface thereof. It is desirable that these materials be subjected to surface treatment to roughen the surface of the current collector. Referring to the shape of the current collector, the current collector may be in the form of foil, film, sheet, net, punched form or formed product such as lath form, porous form, foam and fiber group. The thickness of the separator is not specifically limited. In practice, however, it may be from 1 to 500 μm.

The shape of the battery may be any of coin, button, sheet, cylinder, plate and rectangular parallelopiped. If the shape of the battery is coin or button, the mixture of positive electrode active material and negative electrode material are normally compressed into pellets. The thickness and diameter of these pellets are determined depending on the battery size. If the shape of the battery is sheet, cylinder or rectangular parallelopiped, the mixture of positive electrode active material and negative electrode material are normally applied to the current collector, dried, and then compressed. The application of the material mixture to the current collector can be accomplished by any ordinary coating method.

Examples of such a coating method include reverse-roll coating method, direct-roll coating method, blade coating method, knife coating method, extrusion coating method, curtain coating method, gravure coating method, bar coating method, dip coating method, and squeeze coating method. The coating is preferably effected at a rate of from 0.1 to 100 m/min. The coating method can be properly selected depending on the solution properties and dryability of the material mixture to provide the coating layer with excellent surface conditions. The coating may be effected successively from one side to another or simultaneously on both sides. The coating may be effected continuously, intermittently or in stripe. The thickness, length and width of the coating layer are determined depending on the battery size. In practice, however, the thickness of the coating layer on one side of the current collector is preferably from 1 to 2,000 μm in dried and compressed form.

The drying or dehydration of pellet or sheet can be accomplished by any commonly used method. In particular, hot air, vacuum, infrared rays, far infrared rays, electron rays and low humidity air may be preferably used singly or in combination. The drying or dehydration temperature is preferably from 80° C. to 350° C., particularly from 100° C. to 250° C. From the standpoint of cycle characteristics, the water content in the entire battery is preferably not more than 2,000 ppm and the water content in the positive electrode material mixture, negative electrode material mixture and electrolyte each are preferably not more than 500 ppm. The compression of pellet or sheet can be accomplished by any commonly used method, particularly preferably mold pressing method or calender pressing method. The compression pressure is not specifically limited. In practice, however, it is preferably from 0.2 to 3 t/cm². The calender pressing is preferably effected at a rate of 0.1 to 50 m/min and a temperature of from room temperature to 200° C. The ratio of the width of the positive electrode sheet to that of the negative electrode sheet is preferably from 0.9 to 1.1, particularly from 0.95 to 1.0. The ratio of the content of the positive electrode active material to that of the negative electrode material depends on the kind or formulations of the material mixture and thus cannot be defined. In practice, however, it can be determined to an optimum value from the standpoint of volume, cycle characteristics and safety.

The foregoing material mixture sheet and separator are laminated. The laminate is then inserted into a case (i.e., a can) in a coiled or folded form so that it is electrically connected to the case. The case is then filled with the electrolytic solution. The case is then sealed with a sealing plate to form a battery case. An explosion-proof valve may be used as a sealing plate. The battery may be provided with various known safety elements besides the explosion-proof valve. For example, fuse, bimetal, PTC element, etc. may be used as an overcurrent preventive element. In order to cope with the rise in the inner pressure in the battery case other than by explosion-proof valve, the battery may be notched. Alternatively, the gasket or sealing plate may be provided with cracks. Further, the battery may be designed to disconnect the battery elements from the lead plate in emergency. Alternatively, the charger may be equipped with or connected to a protective circuit for countermeasure against overcharging or overdischarging.

As a countermeasure against overcharging, the battery may be equipped with a system by which current passage is blocked by the rise in the inner pressure in the battery. To this end, the electrolyte or electrode material mixture may contain a compound for raising the inner pressure in the battery. Examples of the compound to be used to raise the inner pressure in the battery include carbonates such as $Li_2CO_3$, $LiHCO_3$, $Na_2CO_3$, $NaHCO$, $CaCO_3$ and $MgCO_3$.

As the case or lead plate there may be used an electrically-conductive metal or alloy. Examples of such the metal or alloy include metals such as iron, nickel, titanium, chromium, molybdenum, copper and aluminum, and alloy thereof. The welding of the cap, case (i.e., can), sheet and lead plate can be accomplished by any known method (e.g., D.C. or A.C. electric welding, laser welding, ultrasonic welding). As the sealing agent there may be used any known compound such as asphalt or mixture thereof.

The application of the nonaqueous secondary battery of the present invention is not specifically limited. If mounted on electronic equipment, the nonaqueous secondary battery of the present invention can be used in color note personal computer, black-and-white note personal computer, pen-touch personal computer, pocket (palm-top) personal computer, note type word processor, pocket word processor, electronic book player, portable telephone, cordless handset, pager, handy terminal, portable facsimile, portable copying machine, portable printer, headphone stereo receiver, video movie, liquid crystal television, handy cleaner, portable CD, mini-disc, electric shaver, electronic translating machine, automobile telephone, transceiver, electric tool, electronic note, electric calculator, memory card, tape recorder, radio, backup power, etc. Other examples of consumers' appliances to which the nonaqueous secondary battery of the present invention can be applied include automobile, electric vehicle, motor, lighting fixture, tool, game device, road conditioner, iron, watch, strobe, camera, and medical equipment (e.g., pace maker, hearing aid, shoulder massager). Further, the nonaqueous secondary battery of the present invention can be used for various military and cosmic purposes. Moreover, the nonaqueous secondary battery of the present invention can be combined with a solar battery.

EXAMPLE

The present invention will be further described in the following examples, but the present invention should not be construed as being limited thereto.

Synthesis Example 1

6.7 g of tin monoxide, 10.3 g of stannous pyrophosphate, 2.87 g of α-alumina, 1.7 g of boric anhydride, 1.63 g of cesium carbonate, and 0.73 g of germanic oxide were dry-mixed, and then put in an alumina crucible. The obtained mixture was then heated in a nitrogen atmosphere at a rate of temperature rise of 15° C./min. to a temperature of 500° C. where it was then calcined for 3 hours. Thereafter, the material was heated in the same atmosphere at a rate of temperature rise of 15° C./min. to a temperature of 1,200° C. where it was then calcined for 12 hours. The material was then allowed to cool to room temperature at a rate of temperature drop of 10° C./min. The material was taken out from the calcining furnace, granulated, and then ground by a jet mill to obtain a negative electrode material $SnGe_{0.07}Al_{0.4}B_{0.5}P_{0.5}Cs_{0.1}O_{3.79}$ (Compound Example 1) having an average particle diameter of 7 μm. The product thus obtained exhibited a broad peak in the vicinity of 28° in the terms of a 2θ value as analyzed by X-ray diffractometry using CuKα ray. The product exhibited no crystalline diffraction line at from 40° to 70° in the terms of 2θ value.

Compound Examples 2, 3 and 4 were synthesized by mixing, calcining and grinding a stoichiometrical amount of raw materials in the same manner as above. These compounds exhibited a broad scattering band having a peak in a range of 20° to 40° in the terms of a 2θ value as analyzed by X-ray diffractometry using CuKα ray. Assuming that A represents the intensity of peak diffraction in the broad scattering band shown in a range of 20° to 40° in the terms of a 2θ value and B represents the intensity of the highest crystalline diffraction shown in a range of 40° C. to 70° C. in the terms of a 2θ value (if no crystalline diffraction line occurs, B is zero), the value B/A was zero for all the foregoing compounds.

Compound Example 2: $SnKo_{0.07}Al_{0.4}B_{0.3}P_{0.5}Cs_{0.1}O_{3.38}$
Compound Example 3: $SnBa_{0.07}Al_{0.4}B_{0.5}P_{0.7}Cs_{0.1}K_{0.1}O_{4.27}$
Compound Example 4: $SnMg_{0.05}Al_{0.4}B_{0.6}P_{0.5}Cs_{0.1}O_{3.85}$ Example 1

86% by weight of Compound 1 synthesized in Synthesis Example 1, 6% by weight of scaly graphite, and 3% by weight of acetylene black as negative electrode materials were mixed. To the obtained mixture were then added 4% by weight of an aqueous dispersion of a polyvinylidene fluoride and 1% by weight of carboxymethyl cellulose as binders. The mixture was then kneaded with water as a medium to obtain a negative electrode material mixture Slurry A-1. Separately, 85% by weight of α-alumina having a particle diameter of 1 μm, 10% by weight of scaly graphite, 4% by weight of an aqueous dispersion of a polyvinylidene fluoride and 1% by weight of carboxymethyl cellulose were mixed. The pH value of the mixture was adjusted with lithium hydroxide to 10.3. The mixture was then kneaded with water as a medium to prepare a Slurry B-1. More separately, 63% by weight of α-alumina having a particle diameter of 2 μm, 32% by weight of scaly graphite, 2.5% by weight of an aqueous dispersion of a polyvinylidene fluoride, 2% by weight of carboxymethyl cellulose were mixed, and 0.5% by weight of sodium alkylbenzenesulfonate. The pH value of the mixture was adjusted with lithium hydroxide to 10.7. The mixture was then kneaded with water as a medium to prepare a Slurry B-2. Slurry A-1, Slurry B-1 and Slurry B-2 were then simultaneously applied to both sides of a copper foil having a thickness of 18 μm in this order by an extrusion method, dried, compression-molded by a calender press, subjected to heat treatment at a temperature of 250° C. for 20 minutes, and then cut into a strip having a predetermined width and length as a negative electrode Sheet 1. The negative electrode sheet thus prepared had a thickness of 128 μm. The thickness of A-1 layer, B-1 layer and B-2 layer on one side were 51 μm, 3.3 μm and 0.9 μm, respectively.

86.4% by weight of $LiCoO_2$, 4% by weight of scaly graphite, 3% by weight of acetylene black, and 0.6% by weight of sodium hydrogencarbonate as positive electrode materials and 2.5% by weight of an aqueous dispersion of a polytetrafluoroethylene, 2.5% by weight of an aqueous dispersion of a polyvinylidene fluoride and 1% by weight of polysodium acrylate as binders were mixed. The mixture was then kneaded with water as a medium to obtain a positive electrode material mixture Slurry C-1. The slurry thus obtained was then applied to both sides of an aluminum foil having a thickness of 15 μm in the same manner as above, dried, subjected to heat treatment at a temperature of 250° C. for 15 minutes, compression-molded by a calender press, and then cut into a strip having a predetermined width and length as a band-like positive electrode Sheet 1. Thus, a band-like positive electrode Sheet 1 having a thickness of 210 μm was prepared. The mol ratio of the coated amount of positive electrode material on the positive electrode Sheet 1 per unit area to the coated amount of negative electrode material on the negative electrode Sheet 1 per unit area was 5.7.

A nickel lead plate and an aluminum lead plate were then welded to the respective end of the foregoing negative electrode sheet and positive electrode sheet. The negative electrode sheet and positive electrode sheet were then dehydrated and dried at a temperature of 250° C. in a dried air having a dew point of −40° C. for 1 hour.

The dried positive electrode sheet (8), a microporous polyethylene film separator, the dried negative electrode sheet (9), and a separator (10) were laminated in this order shown in FIG. 1. The laminate was spirally wound by a winder.

The laminate thus wound was then put into a nickel-plated iron closed-end cylindrical battery case (11). Into the battery case was then poured an electrolyte comprising $LiPF_6$ and $LiBF_4$ dissolved in a 2:4:3:1 (by volume) mixture of ethylene carbonate, dimethyl carbonate, diethyl carbonate and ethyl propionate in an amount of 0.9 mol and 0.1 mol per l, respectively. The edge of the battery can was then cramped inward over a battery cap (12) having a positive electrode terminal with a gasket (13) provided interposed therebetween to prepare a cylindrical battery. The positive electrode terminal (12) had been previously connected to the positive electrode sheet (8) through a lead terminal. The battery case (11) had been previously connected to the negative electrode sheet (9) through a lead terminal. FIG. 1 illustrates a cross-sectional view of a cylindrical battery. The reference numeral (14) indicates an explosion-proof valve. This cylindrical battery will be hereinafter referred to as "Sample 1".

A negative electrode Sheet A was prepared in the same manner as the negative electrode Sheet 1 except that the Slurries B-1 and B-2 were not used and only the slurry A-1 was applied. A negative electrode Sheet B was prepared in the same manner as the negative electrode Sheet 1 except that the Slurry B-2 was not used and only the Slurries A-1 and B-1 were applied.

A negative electrode Sheet 2 was prepared in the same manner as the negative electrode Sheet 1 except that Slurries B-1 and B-2 comprised zirconia having a particle diameter of 2 μm and 3 μm, respectively, instead of α-alumina. A negative electrode Sheet C was prepared in the same manner as the negative electrode Sheet B except that A-1 and B-1 comprised zirconia having a particle diameter of 2 μm and 3 μm, respectively, instead of α-alumina.

These batteries were charged from 2.7 V to 4.2 V and discharged from 4.2 V to 2.7 V, at a rate of 1.4 $mA/cm^2$. The results are shown in Table 1 below.

Charge-discharge cycle characteristics: Number of cycles repeated until 80% of the initial capacity is reached.

Suitability to large current: a ratio of initial discharge capacity when the charge-discharge current is 7 mA/initial discharge capacity when the charge-discharge current is 1.4 mA.

TABLE 1

| Battery Sample No. | Negative Electrode Sheet | Positive Electrode Sheet | Cycle Characteristics (times) | Suitability to large current (%) |
|---|---|---|---|---|
| 1 | 1 | 1 | 520 | 92 |
| 2 | A | 1 | 380 | 87 |
| 3 | B | 1 | 390 | 88 |
| 4 | 2 | 1 | 510 | 92 |
| 5 | C | 1 | 390 | 88 |

Sample Nos. 1 and 4 are according to the present invention the others are comparative)

As in apparent from the results of Table 1, battery Samples 1 and 4 according to the present invention, which each comprise two or more layers containing a solid fine particle, exhibit an excellent charge-discharge cycle characteristics and an excellent charge-discharge characteristics with high current as compared with the samples of Comparative Examples 2, 3 and 5.

Example 2

The procedure of Example 1 was followed except that the coated amount of the slurry C-1 was reduced to 53%. Thus, a positive electrode sheet 2 was prepared. A negative electrode sheet 1 was then prepared in the same manner as in Example 1. The negative electrode sheet thus prepared was then processed to dehydration at 250° C. for 1 hour. Strips of a lithium foil having a thickness of 30 μm were then applied to both sides of the negative-electrode sheet thus dehydrated in an amount of 1.4 g per $m^2$ of each side. Thus, a negative electrode Sheet 3 was prepared. A positive electrode Sheet 1 was then processed in the same manner as in Example 1. The positive electrode Sheet 1 and the negative electrode Sheet 1 were then subjected to assembly in the same manner as in Example 1 to prepare a Battery 11. The battery thus prepared was charged to 3.3 V, and then allowed to stand at a temperature of 46° C. for 13 days. Thereafter, the battery was charged to 4.1 V with the charging voltage controlled constant.

Negative electrode Sheets 4, E, F and G were then prepared in the same manner as the negative electrode Sheet 3 except that the negative electrode Sheets 2, A, B and C of Example 1 were used instead of the negative electrode Sheet 1, respectively. These negative electrode sheets and positive electrode sheets were then combined in the same manner as Battery 11 to prepare Batteries 12 to 16. These samples were each prepared in an amount of 100 by numbers. The average capacity of these batteries (represented relative to that of the Battery 11 as 100) and the percent ratio of samples which had showed an open circuit voltage of not more than 4.0 V after 1 month of ageing at 25° C. are shown in Table 2 below.

TABLE 2

| Battery Sample No. | Negative Electrode Sheet | Positive Electrode Sheet | Average capacity | Ratio of samples showing not more than 4.0 V |
|---|---|---|---|---|
| 11 | 3 | 2 | 100 | 0% |
| 12 | E | 2 | 30 | 8% |
| 13 | F | 2 | 81 | 3% |
| 14 | 4 | 2 | 99 | 1% |
| 15 | G | 2 | 78 | 3% |

(Samples Nos. 11 and 14 are according to the present invention while the others are comparative)

As is apparent from the results of Table 2, Battery Nos. 11 and 14 of the present invention, which each comprise two or more layers containing a solid fine particle, exhibit a high average capacity and a low ratio of samples which show an open circuit voltage of not more than 4.0 V after 1 month of 25° C. ageing as compared with the samples of Comparative Examples 12, 13 and 15.

Example 3

The procedure of Example 2 was followed except that negative electrode material Compound 2, 3 or 4 were used instead of Compound 1. The results were similar to that of Example 2.

In accordance with the present invention, a nonaqueous secondary battery comprising a positive electrode and a negative electrode which each comprise a material capable of reversibly intercalating and deintercalating lithium, a nonaqueous electrolyte containing a lithium salt, and a separator wherein a negative electrode sheet is incorporated therein which comprises two or more layers containing a negative electrode material in an amount of only 0 to 40% by weight and an insulating solid fine particle can exhibit a high capacity, good cycle characteristics and a good preservability.

While the invention has been described in detail and with reference to specific embodiments thereof, it will be apparent to one skilled in the art that various changes and modifications can be made therein without departing from the spirit and scope thereof.

What is claimed is:

1. A nonaqueous secondary battery comprising a sheet-shaped positive electrode having at least one layer containing a lithium-containing transition metal compound as a positive electrode material, a sheet-shaped negative electrode having at least one layer containing a negative electrode material capable of intercalating and deintercalating a lithium ion, a porous separator comprising polyolefines and a nonaqueous electrolyte containing a lithium salt, wherein at least one of said sheet-shaped negative electrode and said sheet-shaped positive electrode comprises three or more layers applied to one side of a current collector and the two layers furthest from said current collector each contain an insulating solid fine particle which doesn't substantially intercalate and deintercalate a lithium ion, wherein said two layers furthest from the current collector have different contents of the insulating solid fine particle which does not substantially intercalate and deintercalate a lithium ion and the content of the insulating solid fine particle in the outermost layer is 5% lower than that in the adjacent layer.

2. The nonaqueous secondary battery as in claim 1, wherein said two layers furthest from the current collector each contain the insulating solid fine particle which doesn't substantially intercalate and deintercalate a lithium ion and a hydrophilic polymer, and the content of the hydrophilic polymer in the outermost layer is higher than that in the adjacent layer.

3. The nonaqueous secondary battery as in claim 1, wherein said two layers furthest from the current collector each contain an insulating solid fine particle which doesn't substantially intercalate and deintercalate a lithium ion and an electrically-conductive particle, and the content of the electrically-conductive particle in the outermost layer is higher than that in the adjacent layer.

4. The nonaqueous secondary battery as in claim 1, wherein said two layers furthest from the current collector each contain an insulating solid fine particle which doesn't substantially intercalate and deintercalate a lithium ion and contain an electrode material capable of intercalating and deintercalating a lithium ion in an amount of from 1% by weight to 40% by weight per the total weight of the insulating solid fine particle.

5. The nonaqueous secondary battery as in claim 1, wherein said two layers furthest from the current collector each have a thickness of from 0.1 $\mu$m to 40 $\mu$m.

6. The nonaqueous secondary battery as in claim 1, wherein said insulating solid fine particle is composed of an inorganic oxide.

7. The nonaqueous secondary battery as in claim 1, wherein said electrode sheet comprising three or more layers applied to a current collector is a negative electrode sheet.

8. The nonaqueous secondary battery as in claim 1, wherein said lithium ion has previously been electrochemically incorporated into said negative electrode material prior to and/or during the assembly of the battery.

9. The nonaqueous secondary battery as in claim 8, wherein the previous incorporation of a lithium ion is carried out by sticking a lithium metal foil having a thickness of from 10 $\mu$m to 70 $\mu$m to said negative electrode sheet.

10. The nonaqueous secondary battery as in claim 9, wherein the amount of lithium said lithium metal foil is from 10 mg to 2 g per g of the negative electrode material.

11. The nonaqueous secondary battery as in claim 1, wherein said negative electrode material is an oxide or chalcogenide compound mainly composed of at least one element selected from the group consisting of elements of the group XIII, XIV and XV of the Periodic Table.

12. The nonaqueous secondary battery as in claim 1, wherein said negative electrode material is an oxide or chalcogenide compound mainly composed of at least one element selected from the group consisting of Pb, Sn, Ge and Si.

13. The nonaqueous secondary battery as in claim 1, wherein said negative electrode material is an amorphous oxide mainly comprising Sn.

14. The nonaqueous secondary battery as in claim 1, wherein said negative electrode material is an amorphous oxide represented by formula (I):

$$SnM^1_aM^2_bO_s \qquad (I)$$

wherein $M^1$ represents at least one element selected from the group consisting of Al, B, P, Ge and Si; $M^2$ represents at least one element selected from the group consisting of elements of the group I, II and III of the Periodic Table and halogen elements; a represents a number of from 0.2 to 2; b represents a number of from 0.01 to 1; and s represents a number of from 1 to 6, with the proviso that a and b satisfy the relationship:

$$0.2<a+b<2.$$

* * * * *